Patented Jan. 6, 1942

2,269,218

UNITED STATES PATENT OFFICE 2,269,218

N-ARYL MORPHOLONE COMPOUND

James G. McNally and Joseph B. Dickey, Rochester, N. Y., assignors to Eastman Kodak Company, Rochester, N. Y., a corporation of New Jersey No Drawing. Application November 8, 1940, Serial No. 364,870

8 Claims. (Cl. 260—247)

This invention relates to lactone amino compounds and more particularly to arylpolyamines and aminophenols containing a lactone group.

A number of aminophenols and polyarylamines are known and some of these in which one or both of the hydrogen atoms of one of the amino groups are replaced by alkyl groups, have found particular use as photographic developers. We have now found that arylpolyamines and aminophenols in which both hydrogen atoms of at least one of the amino groups are replaced by a lactone ring, can be prepared, and that these compounds, in the form of their salts, such as sulfates, are excellent photographic developers. Our new compounds are also useful as couplers in photographic color processes. Our new compounds can be coupled with benzene or naphthalene diazonium compounds to give azo dyes, and are useful intermediates in the preparation of indophenol and anthraquinone dyes.

It is, accordingly, an object of our invention to provide new arylpolyamines and aminophenols. A further object is to provide a process for preparing such compounds. Other objects will become apparent hereinafter.

In accordance with our invention, we prepare arylpolyamines containing a lactone ring by reducing azo compounds of the following general formula:

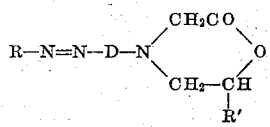

wherein R represents an aryl group, such as a phenyl or naphthyl group, D represents an arylene group, such as a phenylene group or a napthylene group and R' represents hydrogen or an alkyl group. Reduction is advantageously effected by hydrogenation in the presence of a nickel catalyst or a copper chromite catalyst. The following examples will serve to illustrate the process.

Example 1

316 g. (1 mol.) of the following compound:

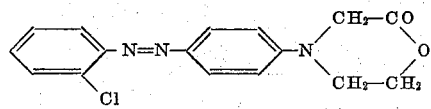

were dissolved in methanol. 5 to 10 grams of Raney nickel catalyst were added to the solution. The resulting mixture was placed in a suitable autoclave and submitted to hydrogenation, under a pressure of 35 to 55 atmospheres of hydrogen, at 50° to 150° C. After two gram-moles of hydrogen were absorbed, the hydrogenation was stopped, the reaction mixture cooled, the catalyst filtered off, and the methyl alcohol and o-chloraniline removed by careful distillation under sub-atmosphere pressure. The residue was recrystallized from methyl alcohol and obtained as a white crystalline substance which slowly darkened upon exposure to air. The formula of the substance is as follows:

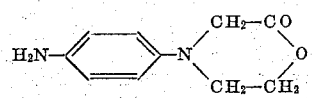

The azo compound employed above was prepared by diazotizing o-chloraniline in the usual manner and adding the diazonium compound to a solution of:

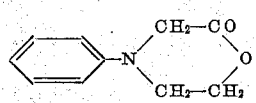

in dilute hydrochloric acid. Coupling was completed by adding sodium acetate and the azo dye was filtered off, washed with water and dried in the air. The lactone compound used in preparing the azo dye was obtained by treating the sodium salt of N-phenylglycine with ethylene chlorohydrin (Kiprianov,— Ukrainskii Kehm. Zhur. 4 Sci. Pt. 231-40, 1929—Chemical Abstracts, 24, 1084).

Example 2

461 g. (1 mol.) of the following compound:

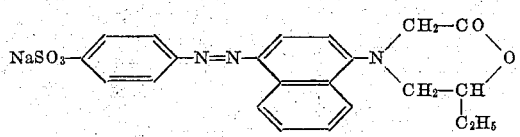

were dissolved in methanol. 5 to 10 grams of copper chromite catalyst (Adkins and Connor,— Jour. Am. Chem. Soc. 53, 1091, 1931) were added to the solution. The resulting mixture was placed in a suitable autoclave and submitted to hydrogenation, under a pressure of 35 to 55 atmospheres of hydrogen at 50° to 150° C. After two gram-moles of hydrogen were absorbed, the hydrogenation was stopped, the catalyst filtered off and the resulting solution treated with sodium chloride to salt out the lactone amine. The lactone amine was thus obtained as a white crystalline compound which slowly darkened upon exposure to air. The lactone amine has the following formula:

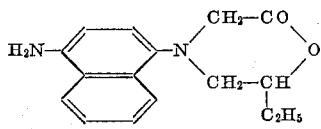

The azo compound employed in this example was prepared by diazotizing sulfanilic acid in the usual manner, and adding the diazonium compound to a solution of:

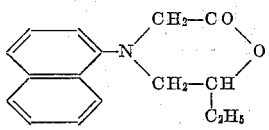

in dilute hydrochloric acid. Coupling was completed by adding sodium acetate, and the azo dye was filtered off, washed with a little water and dried in the air. The lactone compound used in preparing the azo compound was obtained by treating the sodium salt of N-(α-naphthyl)-glycine with 1,2-butylene chlorohydrin.

Our new arylpolylamines containing a lactone ring can be prepared by reduction of nitro compounds of the following general formula:

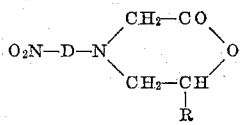

wherein D represents an arylene group, such as a phenylene or a naphthylene group, and R represents hydrogen or alkyl. Reduction is advantageously effected by hydrogenation in the presence of a nickel catalyst. The following examples will serve to illustrate the process.

*Example 3*

288 g. (1 mol.) of a nitro compound having the formula:

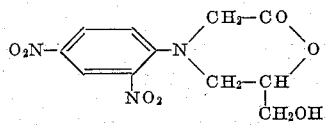

were dissolved in 1,4-dioxane. 5 to 10 grams of Raney nickel catalyst were added to the solution. The resulting mixture was placed in a suitable autoclave and submitted to hydrogenation, under a pressure of 35 to 55 atmospheres of hydrogen, at 50° to 150° C. After 6 gram-moles of hydrogen were absorbed the hydrogenation was stopped, the catalyst filtered off and the dioxane removed by distillation. The residue was recrystallized from methyl alcohol and obtained as a white crystalline substance which slowly darkened upon exposure to air. The substance has the following formula:

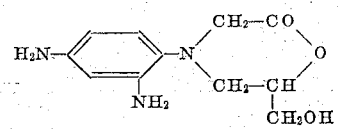

The dinitro compound employed above was prepared by heating the following compound:

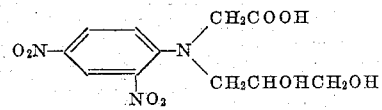

The resulting product was recrystallized from ethyl alcohol.

*Example 4*

211 g. (1 mol.) of the following compound:

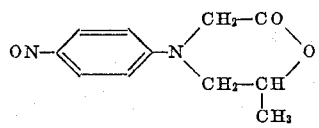

were dissolved in methyl alcohol. 5 to 10 grams of Raney nickel catalyst were added to the solution. The resulting mixture was placed in a suitable autoclave and submitted to hydrogenation, under a pressure of 35 to 55 atmospheres of hydrogen, at 50° to 150° C. After 2 gram-moles of hydrogen were absorbed, the hydrogenation was stopped, the catalyst filtered off and the methyl alcohol removed by distillation. The residue was recrystallized from methyl alcohol and obtained as a white crystalline substance which slowly darkened upon exposure to air. The substance had the following formula:

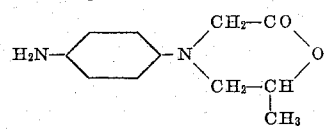

Instead of hydrogen a nickel catalyst, ammonium sulfide, or zinc and hydrochloric acid can be employed as a reducing agent, if desired. The nitroso compound employed in this example was prepared by dissolving one mole of the following compound:

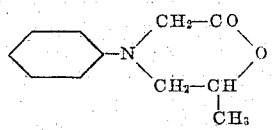

in cold dilute hydrochloric acid and adding one mole of sodium nitrite to the solution slowly. The crystalline nitroso compound which separated, was collected on a filter, washed with water and dried in the air.

Our lactone aminophenols can be prepared by treating a compound of the following general formula:

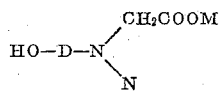

wherein D represents a phenylene or naphthylene group and M represents a metal, with an alkylene oxide. The alkali metal compounds are advantageously employed. The following example serves to illustrate the process.

*Example 5*

173 g. (1 mol.) of the sodium salt of p-hydroxy phenylglycine were heated in an autoclave with 50 g. of ethylene oxide at 150° C. for 10 hours. The reaction mixture was neutralized with sulfuric acid and subjected to distillation at a pressure of from 0.1 to 1.0 mm. of mercury. The product which distilled, solidified to a white crystalline substance which darkened slowly upon exposure to air. It has the following formula:

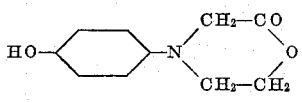

Our lactone aminophenols can also be prepared from our arylpolyamino compounds by diazotization of the amino compounds and hydrolyzing the resulting diazonium salt. The following example will serve to illustrate the process.

Example 6

192 g. (1 mol.) of a compound having the following formula:

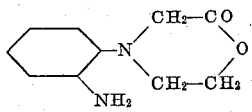

were dissolved in 150 cc. of water containing 25 cc. of hydrochloric acid. Ice was added, and the amino group diazotized by adding 6.9 g. of sodium nitrite. Most of the acid was neutralized. The diazonium compound was hydrolyzed by allowing the resulting solution to come to room temperature and stand for several hours. The phenol which formed was filtered off and recrystallized from methyl alcohol (decolorizing the solution with activated charcoal). The white crystalline product thus obtained has the following formula:

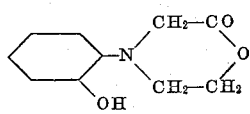

The amino lactone compound which was diazotized in this example was prepared by heating one mole of o-nitrochloraniline with one mole of:

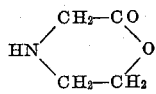

in pyridine with one mole of sodium bicarbonate. The resulting yellow crystalline compound was reduced as in Example 3.

Still further examples of our lactone amino compounds could be given, but the foregoing are believed to demonstrate the manner of practicing our invention.

What we claim as our invention and desire to be secured by Letters Patent of the United States is:—

1. A lactone compound of the following general formula:

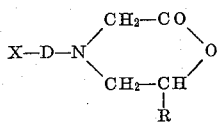

wherein D represents an arylene radical selected from the group consisting of phenylene and naphthylene radicals, R represents a member selected from the group consisting of hydrogen and alkyl groups, and X represents a member selected from the group consisting of hydroxyl and amino groups.

2. A lactone compound of the following general formula:

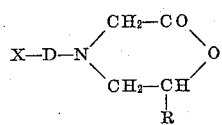

wherein D represents a phenylene radical, R represents a member selected from the group consisting of hydrogen and alkyl groups, and X represents a member selected from the group consisting of hydroxyl and amino groups.

3. A lactone compound of the following general formula:

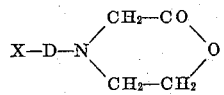

wherein D represents a phenylene group, and X represents a member selected from the group consisting of hydroxyl and amino groups.

4. A lactone compound of the following formula:

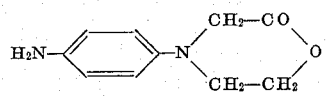

5. A lactone compound of the following formula:

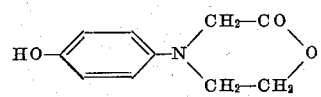

6. A lactone compound of the following formula:

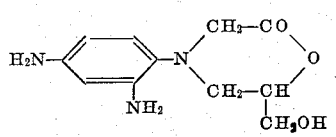

7. A process for preparing a lactone compound comprising reducing a compound selected from the group consisting of compounds of the following general formula:

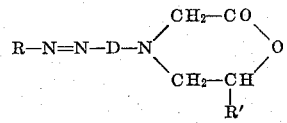

wherein D represents an arylene radical selected from the group consisting of phenylene and naphthylene radicals, R represents an aryl group selected from the group consisting of phenyl and naphthyl groups, and R' represents a member selected from the group consisting of hydrogen and alkyl groups.

8. A process for preparing a lactone compound comprising hydrogenating, in the presence of a nickel catalyst, a compound selected from the group consisting of

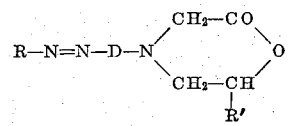

wherein D represents an arylene radical selected from the group consisting of phenylene and naphthylene radicals, R represents an aryl group selected from the group consisting of phenyl and naphthyl groups, and R' represents a member selected from the group consisting of hydrogen and alkyl groups.

JAMES G. McNALLY.
JOSEPH B. DICKEY.